United States Patent Office 3,028,345
Patented Apr. 3, 1962

3,028,345
POLYURETHANE COMPOSITION CONTAINING AN α-METALLO-METALLIC SALT OF A MONO-CARBOXYLIC ACID AND METHOD FOR PREPARING SAME
Robert L. Johnson, Park Falls, Wis.
(302 Breeze Terrace, Madison, Wis.)
No Drawing. Filed June 2, 1959, Ser. No. 817,478
5 Claims. (Cl. 260—2.5)

This invention relates to new compositions of matter and to processes for the production thereof. More particularly, this invention encompasses improved porous and homogeneous polyurethane plastics of rigid, semi-rigid, or elastic consistency; new compositions of matter useful in the manufacture of these polyurethane plastics and processes for the manufacture of the aforementioned compositions of matter and polyurethane plastics.

In general, polyurethane plastics are produced by polyaddition between polyesters or polyglycols and polyisocyanates. Other materials can also be employed in compounding to obtain the final products, such as fillers, accelerators and/or cross-linking agents. When foamed products are sought, water or an aqueous solution may also be employed. Plastic materials having a specific gravity of about 0.02–1.0 are porous and are classified as foamed plastics; those which have a specific gravity of about 1.0–1.4 are non-porous and are designated as homogeneous plastics.

The composition and processes of this invention provide for the improved preparation of polyurethane plastic materials. By providing compositions containing as one of the essential ingredients an α-metallo-metallic salt of an organic acid, a significant acceleration of the polyaddition reaction occurs. To the best of my knowledge, this is the first time that polyurethane materials have been produced from compositions containing as one of the ingredients such metallo-metallic compounds. An example of one of the improvements provided by these compositions, is the reaction between a polyester and a polyisocyanate. Heretofore, this reaction has been inconsistently initiated—one time proceeding with ease; and another time, not proceeding at all. By the utilization of the compositions of this invention, consistent initiation occurs.

In addition to the aforementioned improvements, the processes and compositions of this invention provide for better production of polyurethane foams by producing a foam stabilization effect. Because of this stabilization, materials otherwise collapsing and not foaming are rendered as foamed products.

Another improvement is the preparation of economical foamed products by the reaction between a polyglycol and a polyisocyanate. Heretofore, foamed products from these materials have not been considered, since a necessity for expensive foaming agents has made the route unattractive commercially. In contrast, this invention provides compositions and processes which allow for the economical preparation of polyurethane plastic foams from a polyglycol and polyisocyanate.

It is thus an object of this invention to provide new compositions of matter useful in the preparation of improved polyurethane plastics. Another object is to provide a process for the manufacture of these new compositions of matter. A still further object of this invention is to provide a process utilizing the aforementioned new compositions of matter in the preparation of polyurethane plastic materials. Another object is to provide improved polyurethane plastics of porous or homogeneous nature having rigid, semi-rigid, or elastic consistency.

The above and other objects are attained in accordance with this invention by providing new compositions of matter, suitable for producing polyurethane plastics, comprising α-metallo-metallic salts of carboxylic acids and a compound selected from the group consisting of polyisocyanates and organic compounds having at least two reactive hydrogen atoms. Also within the scope of this invention is a new composition of matter comprising an α-metallo-metallic salt of a carboxylic acid, a polyisocyanate and a compound selected from the group consisting of polyesters and polyglycols. Another composition of matter within the scope of this invention, suitable for producing foamed polyurethane plastics, comprises α-sodio-sodium acetate, a polyisocyanate, a polyglycol and a foaming agent. Relative to this latter embodiment, it is pointed out that the term "foaming agent" includes any prior art polyurethane foaming agent as well as the novel foaming agents of this invention. Both classes of foaming agents are defined more fully hereinafter.

Through the employment of the aforementioned compositions it is possible to produce improved polyurethane plastic materials. Thus, this invention also encompasses as a new composition of matter the product produced by the reaction between α-metallo-metallic salts of carboxylic acids, a polyisocyanate and an organic compound having at least two reactive hydrogen atoms—the latter compound preferably being a polyglycol or a polyester.

Also within the scope of this invention are processes for the preparation of polyurethane products comprising reacting α-metallo-metallic salts of carboxylic acids, an organic compound having at least two reactive hydrogen atoms and a polyisocyanate. (Whenever the terms "organic compound having at least two reactive hydrogen atoms" is employed in this specification, it is intended that said compound be capable of forming polyurethane.) By the term "reacting" is meant any method for combining the three aforementioned reactants together so that a reaction can be effected. Thus, the term encompasses adding the metallo-metallic salt of a carboxylic acid to a mixture of the polyisocyanate and the organic compound. It also includes adding either the organic compound or the polyisocyanate to a mixture of the α-metallo-metallic salt and either the organic compound or the polyisocyanate. Furthermore, it is possible to add the aforementioned mixtures to any of the ingredients not included in the mixture: as, for example, the addition of a mixture of polyisocyanate and organic compound to an α-metallo-metallic salt of an organic acid.

The following working examples are more fully illustrative of this invention. In these working examples, all parts and percentages are by weight.

*Example I*

This example shows the effect which the addition of an α-metallo-metallic salt of a carboxylic acid has in the formation of polyurethane plastics. The example consists of two runs—one without the α-metallo-metallic salt and one having said salt incorporated in the reaction mixture. The procedure in the case where no metallo-metallic salt was utilized was as follows: To 100 parts of Du Pont L-167 (a diisocyanate of about 1000 molecular weight which is the reaction product of a polytetramethylene with ether glycol and tolylene diisocyanate) was added 0.5 part each of N-methylmorpholine, Dow Corning silicone oil C-200, a dimethyl polysiloxane (100 c.p.s.), and water. Gas was produced, but almost all escaped prior to gellation.

The above experiment was repeated with the exception that in addition to the above described materials, 1 part of α-sodio-sodium acetate was incorporated into the reaction mixture. A considerable improvement in foam stability was observed. This latter reaction mixture reacted faster, holding more gas and had a much better structure than the material produced in the aforementioned run.

Example II

In this example, the improvements resulting from the employment of an α-metallo-metallic salt of a carboxylic acid are further illustrated. This example again consisted of two runs—one with α-sodio-sodium acetate and a comparison run without α-sodio-sodium acetate.

A foam was made utilizing 75 parts of Du Pont L-167 (a diisocyanate of about 1000 molecular weight which is the reaction product of a polytetramethylene with ether glycol and tolylene diisocyanate) and adding 25 parts Nacconate 65 (tolylene diisocyanate) and 0.5 part each of N-methylmorpholine, Dow Corning silicon oil (a dimethyl polysiloxane) and water. This foam expanded to a density of about 6 pounds per cubic foot, but collapsed to about 30 pounds per cubic foot.

Repetition of the above example with 1.0 part of α-sodio-sodium acetate resulted in foam expansion to about 10 pounds per cubic foot, followed by a small shrinkage to about 15 pounds per cubic foot.

Example III

This example illustrates the utilization of one of the compositions of this invention, a mixture of an α-metallo-metallic salt of a carboxylic acid and a polyisocyanate, in the preparation of a polyurethane plastic material.

Polyethylene glycol 200 (75 parts) and 25 parts of dimethyl adipate and 5 parts of α-sodio-sodium acetate are thoroughly mixed. This mixture is then added to a reaction vessel containing 100 parts 2,4-tolylene diisocyanate. The combined ingredients were again thoroughly blended and a reaction occurred spontaneously producing a foamed polyurethane product.

Example IV

This example illustrates the effect which the addition of an α-metallo-metallic salt of a carboxylic acid has on a reaction for the preparation of polyurethane plastic material involving the poly addition between a polyester and a polyisocyanate.

To a reaction vessel are added 100 parts of 2,4-tolylene diisocyanate, 25 parts polyethylene glycol 200, 75 parts dimethyl adipate. This mixture was thoroughly blended. However, no reaction could be initiated. Thereupon, 1 part α-sodio-sodium acetate was added to the reaction mixture and the mixture again was well mixed so as to incorporate the acetate ingredient throughout the reaction mixture. The mixture then evolved heat and foamed yielding a good tough, white foamed plastic material.

Example V

The process of Example IV was repeated with the exception that in place of 75 parts dimethyl adipate there was utilized 75 parts of a polyester produced from adipic acid and ethylene glycol. A good foamed plastic material was thereby produced.

Example VI

The following example illustrates a process wherein α-metallo-metallic salt of a carboxylic acid is reacted with a polyglycol utilizing a foaming agent. In this example it is to be noted that the foaming agent employed is water.

In a reaction vessel there was added 800 parts of a polyoxy ethylene glycol having a molecular weight of 700 (Wyandotte 740), 32 parts α-sodio sodium acetate, 75 parts tolylene diisocyanate (80/20 mixture of a 2,4/2,6-isomer), 64 parts of standard melamine formaldehyde resin (Rohm-Haas MM-55), 32 parts tetrachloro-bis-phenol-A, 8 parts calcium stearate, 4 parts silicone oil (Union Carbide X-520, a dialkoxy polysiloxane), 10 parts N-methylmorpholine. This mixture is blended well so as to obtain good dissolution of all parts. Thereafter 4100 parts of a polyoxy ethylene glycol having a molecular weight of about 400 (Wyandotte 440), 82 parts of water and 3075 parts of tolylene diisocyanate were added and blended thoroughly with the reaction mixture. Spontaneous foaming occurred and a rigid foamed product having a density of about 2.3 pounds per cubic foot was obtained. This foam was very waterproof and not affected by gasoline.

Example VII

A reaction vessel containing 48 parts of a polyoxy ethylene glycol having a molecular weight of about 400 (Wyandotte 440), 48 parts of a polyoxy alkylene glycol having a molecular weight of about 700 (Wyandotte 740) and 1 part N-methylmorpholine are added. 89 parts tolylene diisocyanate (80/20-2,4/2,6-isomer), 2.7 parts tetrachloro-bis-phenol-A, 1.4 parts α-sodio-sodium acetate, 2.7 parts of a standard melamine formaldehyde resin (Rohm-Haas MM-55), 1.4 parts calcium stearate, 0.7 part silicone oil (Union Carbide X-520, a dialkoxy polysiloxane) and 1 part water. The reaction mixture is thoroughly blended and spontaneous reaction occurs yielding a rigid foam having a density of about 2.1 to about 2.6 pounds per cubic foot.

The organic compounds having at least two reactive hydrogen atoms which can be employed in the instant invention are broadly any of the prior art polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, esterified polyglycols, and the like, having free reactive hydrogen atoms, free reactive carboxylic and/or especially hydroxyl groups may be employed in the process of the invention and condensed in the apparatus useful for carrying out that process. Moreover, any organic compound containing at least two radicals selected from the class consisting of hydroxyl and carboxyl groups may be employed in the practice of the invention. Thus, generally, any organic compound having at least two reactive hydrogen atoms and which gives a positive test for reactive hydrogen as determined by the Zerewitinoff method can be utilized in this invention. Those compounds falling within this description which are most generally used are polyesters and polyglycols.

The polyesters used for the production of the polyurethanes having a specific gravity in the range of about 0.02–1.4 (i.e., those of rigid, semi-rigid or elastic consistency) may be branched and/or linear. Thus, the useful polyesters and/or polyesteramides may include those obtained by condensing any polybasic (preferably dibasic carboxylic) organic acid, such as adipic, sebacic, 6-amino-caproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, and the like, with polyalcohols such as ethylene glycol, diethylene glycol, pentaglycol, glycerol, sorbitol, triethanolamine, di-(β-hydroxyethyl) ether, and the like, and/or aminoalcohols such as ethanolamine, 3-aminopropanol, 4-aminopropanol, 5-aminopentanol-1, 6-aminohexanol, 10-aminodecanol, 6-amino-5-methyl-hexanol-1, p-hydroxymethylbenzylamine, and the like; and with mixtures of the above polyalcohols and amines (ethylene diamine, hexamethylene diamine, 3-methylhexamethylene diamine, decamethylene diamine and m-phenylenediamine, and the like), and/or amino-alcohols, and the like. In the esterification, the acid per se may be used for condensation or, where desirable, equivalent components, such as the acid halide or anhydride may be used.

The polyglycols used in the practice of the invention can be alkylene glycols and polyoxyalkylene glycols comprising ethylene glycol, propylene glycol, butylene glycol-2,3; butylene glycol-1,3; 2-methyl pentanediol-2,4; 2-ethylhexanediol-1,3; hexamethylene glycol, styrene glycol and decamethylene glycol, and the like, and diethylene glycol, triethylene glycol, tetraethylene glycol, polyethylene glycols 200, 400 and 600, and the like, dipropylene glycol, tripropylene glycol, polypropylene glycols 400, 750, 1200 and 2000 and the like.

The organic polyisocyanates useful in the practice of the invention include ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, 2,4-tolylene diisocyanate, 1,6-tolylene diisocyanate, 3,3'-dimethyl-4,4'-biphenylene diisocyanate, 3,3'-dimethoxy-4,4'-diphenylene diisocyanate, 3,3'-diphenyl-4,4'-biphenylene diisocyanate, 4,4'-biphenylene diisocyanate, 3,3'-dichloro-4,4'-biphenylene diisocyanate, triphenylmethane triisocyanate, 1,5-naphthalene diisocyanate or polyisocyanates in a blocked or inactive form such as the bis-phenyl carbamates of tolylene diisocyanate, p,p'-diphenylmethane diisocyanate, p-phenylene diisocyanate and 1,5-naphthalene diisocyanate, and the like.

The α-metallo-metallic salts of carboxylic acids employed herein can be represented by the following general formula

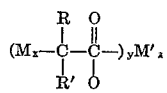

wherein R and R' can be the same or different and are selected from the group consisting of hydrogen and hydrocarbon radicals; M and M' are monovalent or polyvalent metals which can be the same or different; and $x$, $y$, and $z$ are small whole numbers which can be the same or different. The radicals R and R' can contain between about 1 and 20 carbon atoms and are substituted or unsubstituted. When substituted, groups like amino, nitroso, halo, cyano, carboxy, keto and the like can be employed. Those α-metallo-metallic salts especially preferred in the processes of this invention are the alkali and alkaline earth metal salts of an α-metallo acetate. These compositions are produced according to the methods described in U.S. 2,850,528.

The following list of compounds more fully describe the α-metallo-metallic salts of this invention: α-sodio-sodium propionate, α-sodio potassium-4-methyl caproate, α-potassio sodium vinyl acetate, α-sodio-sodium-2-cyclohexyl acetate, α-lithio-lithium isobutyrate, α-sodio calcium acetate and α-potassio aluminum acetate. These compounds can be employed in approximately corresponding ratios in the foregoing examples in place of the α-sodio-sodium acetate and related compounds employed therein to produce foamed epoxy resin products.

In preparing polyurethane plastics by the processes of the instant invention, the condensation of polyesters or polyglycols and polyisocyanates can be carried out in the presence of an "activator mixture"; (the term "activator mixture" includes as one of its essential elements an α-metallo-metallic salt of a carboxylic acid, along with other materials such as cross-linking agents and to which may be added waterproofing agents such as calcium stearate, stearic acid and the like; lubricants such as silicone oils, curing agents, foaming agents and any other material generally employed in the prior art for the preparation of polyurethane plastic material of rigid, semi-rigid or elastic consistency). The activator mixture can be introduced into the reaction mixture in a fine state of subdivision at an elevated pressure substantially higher than that of the reactant mixture. Mixing of the components can be effected in an enclosed vessel for a short period of time, and the resultant product is discharged while still in the liquid state and before any substantial liberation of gases has taken place. It is preferred to introduce the activator mixture into the polyester- or polyglycol-polyisocyanate intermittently for most effective operation. However, it is possible to control conditions so that, in certain operations, a continuous feed for this component may be utilized. The activator mixture can be introduced into the polyester-polyisocyanate shortly before the polyaddition reaction takes place; and the cross-linking action and/or foaming of the polyurethanes thereby becomes one of extremely high intensity and yields a more homogeneous product for use in the manufacture of moldings, cavity fillings, coatings, piece goods, and the like.

As has been mentioned hereinbefore, mixing of the ingredients is necessary to assure proper contact between the reactants. The mixing time may be varied depending on the proportions and character of the components employed as well as the type of plastic desired. Normally the mixing time is in the range of 0.5–25 seconds, although longer or even shorter mixing periods may in some cases be desirable. The final reaction mixture, in the liquid state, may be treated in various ways. For example, it may be passed onto a screw conveyor which forces the mixture through appropriately shaped nozzles to produce moldings of any desired design or insulating coverings for cables. Sometimes it is desirable to complete and/or accelerate the reaction of the liquid mixture issuing from the mixing chamber by heating. And this, of course, can be done.

To the polyisocyanates one may add, in anhydrous condition, oils such as paraffin oils (or other mineral oils) or surface-active substances to serve as activators for facilitating the feeding of the isocyanate. Such oils may also be added to one or more of the other components used in the formation of the plastics. These oils affect the porosity and/or density of the final product, which may be varied by varying the quantity of anhydrous oil added.

The proportion of α-metallo-metallic salt employed in the composition of the instant invention can be based as a percentage of the total reaction mixture. Thus, generally, 0.1 percent to about 5 percent α-metallo-metallic salt of carboxylic acid to total reaction mixture can be employed. In most cases the proportion falls within the range of about 0.3 to about 2.5 percent metal salt to total reaction mixture. Another way of describing the proportion of α-metallo-metallic salt utilized in the composition of this invention is based on the percentage of parts of α-metallo-metallic salt to total parts of polyglycol or polyester and polyisocyanate. Thus, generally, 0.2 to about 8 percent α-metallo-metallic salt of a carboxylic acid to total parts of polyisocyanate and compounds having at least 2 reactive hydrogen atoms as defined hereinbefore can be used. Most cases find 0.4 to about 3.5 percent of metal salt to total parts of polyisocyanate and said organic compound being employed.

In the prior art, two groups of foaming agents are generally used in the preparation of cellular materials—inorganic foaming agents and organic substances decomposed by heat to liberate gases. To the latter belong mixtures of urea and biuret, the phenylhydrazines, diazoamide benzene, azo dinitriles, dinitrosopentamethylene tetramine, the salts of bis-(amino methyl) disulfide, and pent-az-diene. Other illustrative prior art blowing agents are sodium bicarbonate, 2,5-dimethyl-2,5-dicyano-3,4-diazohexane, diazoamino benzene, azodiisobutyronitrile, and other selected nitrogen compounds as for example di-N-nitroso pentamethylene tetramine, di - N - nitrosopentamethylene diamine, etc. Furthermore, N-nitroso β-amino ketones such as N-isopropyl N-nitroso diacetone amine, and N-methyl N-nitroso diacetoneamine, etc., can be employed. Also selected bis-nitroso-N,N'-di(α,α-dialkyl-gamma-ketoalkyl) alkanes, etc. In addition to these foaming agents it is preferred to employ as a foaming agent in this invention an inert solvent having a boiling point between about 100 and 200° C. By inert is meant inert to the α-metallo-metallic salt of a carboxylic acid used in this invention. Representative of these inert solvents are aromatic hydrocarbons such as toluene, xylene, ethyl benzene, etc.; dipropyl amine, aliphatic cyclic amines such as, morpholine, cyclohexylamine, pyridine, methyl piperidine, etc.; ethers like dimethoxy ethane, dimethyl ether of diethylene glycol, methylphenyl ether, etc.; esters such as butyl acetate, ethyl propionate, etc. In addition to the above discussed foaming agents which are applicable in the instant invention, compounds which release carbon dioxide when reacted with a polyisocyanate can also be termed foaming agents for the purposes of this invention. Illustrative of this type of foaming agent are the organic compounds having at least two reactive hydrogen atoms and containing a carboxylic functional group which have been thoroughly discussed hereinabove. It should also be noted in certain applications that water can be utilized as a foaming agent in the instant invention.

In most cases about 0.25–5 percent by weight of the reaction mixture corresponds to the amount of foaming agent which should be utilized. When an inert solvent having a boiling point between about 100–200° C. is used in amounts more than 5 percent by weight of the reaction mixture, the toughness and strength of the polyurethane foam produced is sometimes decreased.

The cellular products produced in accordance with this invention may be used as insulating material for both high and low temperature work. Furthermore, these polyurethane products find utility in the manufacture of molding, coatings and piece goods.

What is claimed is:

1. A polyurethane composition obtained by reacting an organic polyisocyanate with an organic compound having at least two reactive hydrogen atoms as indicated by a positive Zerewitinoff test; said reaction taking place in the presence of an α-metallo-metallic salt of a monocarboxylic acid containing up to about 20 carbon atoms, the proportion of said salt utilized being 0.1 to about 5 percent of the weight of the total reactants, and wherein said metallo and metallic elements are selected from the group consisting of alkali and alkaline earth metals.

2. A polyurethane composition obtained by reacting (1) an organic polyisocyanate with (2) an organic compound selected from the group consisting of (A) polyglycols and (B) polyesters produced by the reaction of a polyhydric alcohol and a polycarboxylic acid, said organic compound containing at least two reactive hydrogen atoms as indicated by the positive Zerewitinoff test: said first named reaction taking place in the presence of α-sodio-sodium acetate employed in a proportion of 0.1 to about 5 percent of the weight of said reactants (1) and (2).

3. A foamed polyurethane composition obtained by reacting (1) an organic polyisocyanate with (2) a polyglycol in admixture with (3) a foaming agent to foam the polyurethane, and (4) α-sodio-sodium acetate; said acetate being employed in a proportion of 0.1 to about 5 percent of the weight of said composition.

4. The process of producing a polyurethane comprising reacting (1) an organic polyisocyanate with (2) an organic compound having at least two reactive hydrogen atoms as indicated by a positive Zerewitinoff test, the reaction taking place in admixture with an α-metallo-metallic salft of a monocarboxylic acid containing up to about 20 carbon atoms; said salt being employed in a proportion of 0.1 to about 5 percent of the total weight of the reactants, said metallo and metallic elements of said salt being selected from the group consisting of alkali and alkaline earth metals.

5. A polyurethane composition obtained by reacting (1) an organic polyisocyanate and (2) an organic compound selected from the group consisting of (A) polyglycols and (B) polyesters produced by the reaction of a polyhydric alcohol and a polycarboxylic acid, said organic compound having at least two reactive hydrogen atoms as indicated by a positive Zerewitinoff test, said first named reaction taking place in the presence of an α-metallo-metallic salt of a monocarboxylic acid containing up to about 20 carbon atoms; the proportion of said salt being 0.1 to about 5 percent of the total weight of the reactants (1) and (2), said metallo and metallic elements of said salt being selected from the group consisting of alkali and alkaline earth metals.

References Cited in the file of this patent

UNITED STATES PATENTS

| | | |
|---|---|---|
| 2,764,565 | Hoppe et al. | Sept. 25, 1956 |
| 2,850,528 | Closson | Sept. 2, 1958 |

OTHER REFERENCES

Dombrow: "Polyurethanes," Reinhold Pub. Corp., copyright 1957, pages 17–19.

Heiss et al.: "Ind. & Eng. Chem.," volume 46, No. 7, July 1954, pages 1498–1503.